United States Patent
Kraibühler et al.

(10) Patent No.: US 9,039,953 B2
(45) Date of Patent: May 26, 2015

(54) METHOD FOR PRODUCING A THREE-DIMENSIONAL OBJECT

(71) Applicant: Arburg GmbH + Co. KG, Lossburg (DE)

(72) Inventors: Herbert Kraibühler, Lossburg (DE); Eberhard Duffner, Starzach (DE)

(73) Assignee: ARBURG GMBH + CO. KG (DE)

( * ) Notice: Subject to any disclaimer, the term of this patent is extended or adjusted under 35 U.S.C. 154(b) by 0 days.

(21) Appl. No.: 13/671,867

(22) Filed: Nov. 8, 2012

(65) Prior Publication Data

US 2013/0071599 A1    Mar. 21, 2013

Related U.S. Application Data

(63) Continuation of application No. PCT/EP2012/003289, filed on Aug. 2, 2012.

(30) Foreign Application Priority Data

Aug. 4, 2011    (DE) .......................... 10 2011 109 368

(51) Int. Cl.
*B29C 35/08* (2006.01)
*B29C 41/02* (2006.01)
*B29C 67/00* (2006.01)

(52) U.S. Cl.
CPC .......... *B29C 67/0059* (2013.01); *Y10T 428/19* (2015.01)

(58) Field of Classification Search
CPC ...... B29C 35/08; B29C 41/02; B29C 67/0059
USPC ........................................................ 264/308
See application file for complete search history.

(56) References Cited

U.S. PATENT DOCUMENTS

| | | | |
|---|---|---|---|
| 5,203,944 A | 4/1993 | Prinz et al. | |
| 6,508,971 B2 * | 1/2003 | Leyden et al. | ............ 264/308 X |
| 7,364,686 B2 * | 4/2008 | Kritchman et al. | ....... 264/308 X |
| 2010/0125356 A1 * | 5/2010 | Shkolnik et al. | ................ 700/98 |
| 2010/0191360 A1 * | 7/2010 | Napadensky et al. | ........... 700/98 |

FOREIGN PATENT DOCUMENTS

| | | |
|---|---|---|
| DE | 69206357 T2 | 6/1996 |
| EP | 1886793 A1 | 2/2008 |
| WO | 2009013751 | 1/2009 |

* cited by examiner

*Primary Examiner* — Leo B Tentoni
(74) *Attorney, Agent, or Firm* — Cantor Colburn LLP

(57) ABSTRACT

A method serves to produce a three-dimensional object by additive construction in direct construction sequence from solidifiable material, which is either present in the starting state in a fluid phase or can be liquefied, where multiple material components are discharged alternately in a programmable manner by means of multiple discharge units and configure different parts of the object joined to one another as a result of the discharge, where the geometric proportions obtained during discharge already correspond to the object, and because the material components form between them either edge regions merging into one another without boundaries or boundary regions of the different material components abutting one another without joining, a method and an object produced therewith can be provided, in which boundary and edge regions are formed "as if from one piece" between different material components even in the case of complex geometries.

21 Claims, 2 Drawing Sheets

METHOD FOR PRODUCING A THREE-DIMENSIONAL OBJECT

CROSS REFERENCE TO RELATED APPLICATIONS

This application is a continuation of International Patent Application Number PCT/EP2012/003289 filed on 2 Aug. 2012, which designates the U.S. and which claims priority to German Patent Application Number 10 2011 109 368.4 filed on 4 Aug. 2011, both of which said applications are herein incorporated by reference in their entirety.

TECHNICAL FIELD

The invention relates to a method for producing a three-dimensional object from a solidifiable material and also to an object produced therewith.

BRIEF DESCRIPTION OF RELATED ART

In plastic part production, parts are produced by injection moulding or extrusion in large batch sizes and series using moulds. The advantage of plastic injection moulding in particular rests especially on the highly precise production of complex part geometries, wherein the versatility of operation of the injection moulding process covers the requirements for an inexpensive and economical production of plastic parts in an optimum manner. However, plastic injection moulding reaches its limitations when materials that are not compatible with one another have to be processed or, in the case of positive-locking connections in particular, problems arise with removal from the mould.

At the same time, there is an ever-increasing demand for plastic parts in a unit number of one and small batch sizes such as pattern parts, for example, with the requirement of provision in a very short period as well as properties that are similar to those of injection moulded parts. For the production of such parts there are production processes that are widely known by the term prototyping and rapid manufacturing. The production of such parts, in most cases, is based on generation of the geometry from 3D data without tools, i.e. without moulds. These geometries are produced in a wide variety of shapes by appropriate means such as melting powder layers by the application of heat, e.g. by means of lasers, additive systems such as compression processes in a different connecting shape of the powder parts or also in the so-called melt extrusion process. In particular, the powder processes also reach their limitations when multiple different material components have to be processed next to one another.

A device, wherein a plasticising unit known in injection moulding technology is coupled to a pressurisable material storage device for a liquid phase of a material, is known from EP 1 886 793 A1 that forms the basis of the preamble of claim 1. To generate an object on an object support, this material is discharged in the form of drops there through a discharge opening. Because of the adhesion forces of the material a high pressure and high melting temperatures are necessary for the material, especially as the drop must have a size of 0.01 to 0.05 mm$^3$ to obtain an appropriate surface quality. Different parts of the object are already joined to one another as a result of the discharging of the drops. The geometric proportions obtained during discharge are substantially retained during the production process and already correspond to the object. It is already proposed there, paragraphs [0016] and [0035], to discharge different material components by means of multiple discharge units so that they mix with one another at the impact point without separating. The aim in this case is a mixing of material. Boundary regions of different materials or the use of reactive multicomponents can thus be realised efficiently.

A laser sintering process, in which metal powder layers are welded to one another by heat application by means of lasers, is known from DE 692 06 357 T2. The supply of energy necessary for this enables the object and its geometry to be formed only after discharge of the material. The materials are welded or alloyed. This influences the final external geometry of the object. In the process a layered structure of a metal part is formed by selectively assembling layers by welding and by applying by plasma spraying virtually as a second component a very brittle auxiliary layer for the assembly process that serves as support structure for overhangs and also in order to minimise delays. After a layer is applied, this is milled in order to have a defined geometry plane for the next layer. In this welding process alloying materials can be fused together so that the boundary layer comprises an alloy of both materials.

BRIEF SUMMARY

Starting from this prior art, the invention provideS a method and an object produced therewith, in which boundary and edge regions are formed "as if from one piece" between different material components even in the case of complex geometries.

This solution enables direct edge layer regions to be generated with comparable firm connection with one another, as is otherwise only possible with the use of one material component, e.g. in the injection moulding process. Fusing edge layers, which either merge into one another without boundaries and form a connecting structure, but which are nevertheless not joined and can form adjoining boundary regions or also intermediate layers, as necessary, which can be activated later as a movable connection, are formed in quick alternation in the transition regions between different material components.

No combination of the plastic chains is formed in the boundary layer even in the case of compatible materials. Instead, a van der Waals electron bonding of the ends of the plastic chains of the individual materials can occur. Moreover, no microscopic mixing of the molecules occurs because of the relatively poor flowability of the plastic molecules. Therefore, in the plastics technology sense the boundary layer is not a compound but a boundary layer. This applies all the more in the case of incompatible materials, since this is then a matter of "point-microscopic positive-locking" of the connection.

Where necessary, it is also possible to use a material component so that it is configured as a support that can be detached later after the production of the object. As a result, overhangs can be generated on the object without any problem, while at the same time corresponding surfaces of the finished object can be produced by keeping to boundary regions or by the formation of intermediate layers. This enables production down to a unit number of one of objects that, on the one hand, have material properties that are better than those of injection moulded parts, where necessary, but on the other hand, also have such complex geometries that they can be produced only with high expenditure with the injection moulding process, if at all.

The use of appropriate intermediate layers, which are either detachable upon movement of the adjoining parts and/or form a sliding connection, also allows objects with complex geometries with undercuts such as e.g. universal joints or ball joints to be produced according to this method.

Further advantages are evident from the sub-claims and the following description.

BRIEF DESCRIPTION OF THE DRAWINGS

The invention is explained in more detail below on the basis of exemplary embodiments represented in the Figures.

DETAILED DESCRIPTION

The invention will now be explained in more detail in an exemplary manner with reference to the attached drawings. However, the exemplary embodiments are only examples that are not meant to restrict the inventive concept to a specific arrangement. Before the invention is described in detail, it should be noted that it is not restricted to the respective structural parts of the device or the respective method steps, since these structural parts and methods can vary. The terms used here are merely intended to describe particular embodiments and are not used for restriction. Moreover, when the singular or indefinite article is used in the description or in the claims, this also relates to the plural of these elements unless the overall context clearly indicates something different.

The Figures show different objects that are produced in accordance with the method. The method serves to produce a three-dimensional object such as rapid-prototype parts with the multicomponent process, wherein the object is produced in direct construction sequence using additive construction. In this case, an additive construction is understood to be a gradual construction generating the structural part, e.g. line by line or layer by layer of an object. In an extreme case this relates to construction drop by drop. In this case, "direct construction sequence" is understood to mean that the object is constructed point by point, irrespective of which material component must currently be output.

Figure 3B:
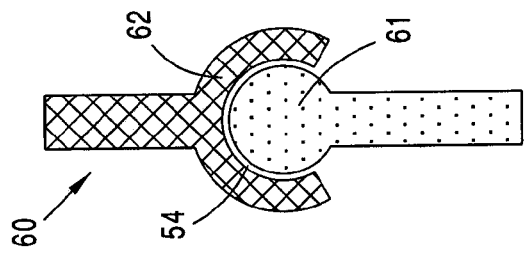
FIGS. 3a, 3b show a ball and socket joint produced according to the method directly after production and in the state of use after after-treatment of an intermediate layer.
Figure 3A:
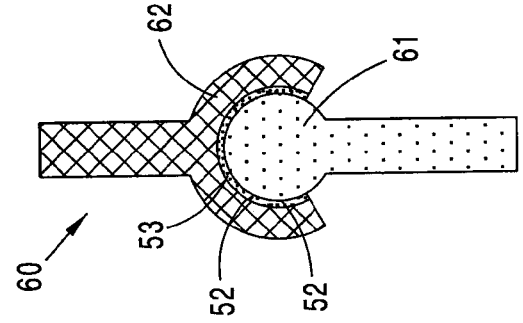

The solidifiable material, from which the three-dimensional object 50, 50' or the ball and socket joint 60 according to FIGS. 3a, 3b as object is produced, is present either in the starting state in a fluid phase or can be liquefied. The solidifiable material is a plasticisable material such as plastic or also materials in powder form, wherein substantially what matters is that the solidifiable material is present as a plasticised material in the starting state. The material can also be a material that is reversibly meltable under heat application and is therefore recyclable. In principle, all materials such as resins, thermoplastics, silicones and other support materials that allow an additive construction are conceivable. Since a plasticising unit known in injection moulding technology is preferably used for processing the solidifiable material as plasticised or plasticisable material, a standard commercially available material or a material present during injection moulding can be used to produce the parts. A special separate material is therefore not necessary.

The discharge of the solidifiable material can occur either sequentially in the form of drops from a discharge opening of at least one timed or clocked discharge unit 12', as is known, for example, from EP 1 886 793 A1. However, a discharge in strands from a discharge unit can also occur, wherein combinations of both discharge methods are possible for faster part formation. Multiple discharge units, but at least multiple material storage devices, are provided that alternately discharge drops as the smallest discharge quantity in a programmable manner. Different parts of the object 50, 50' are thus already joined to one another as a result of the discharge. Thus, the geometric proportions already corresponding to the object 50, 50' are preferably already formed during the discharge of the material in particular the drops.

Figure 4:
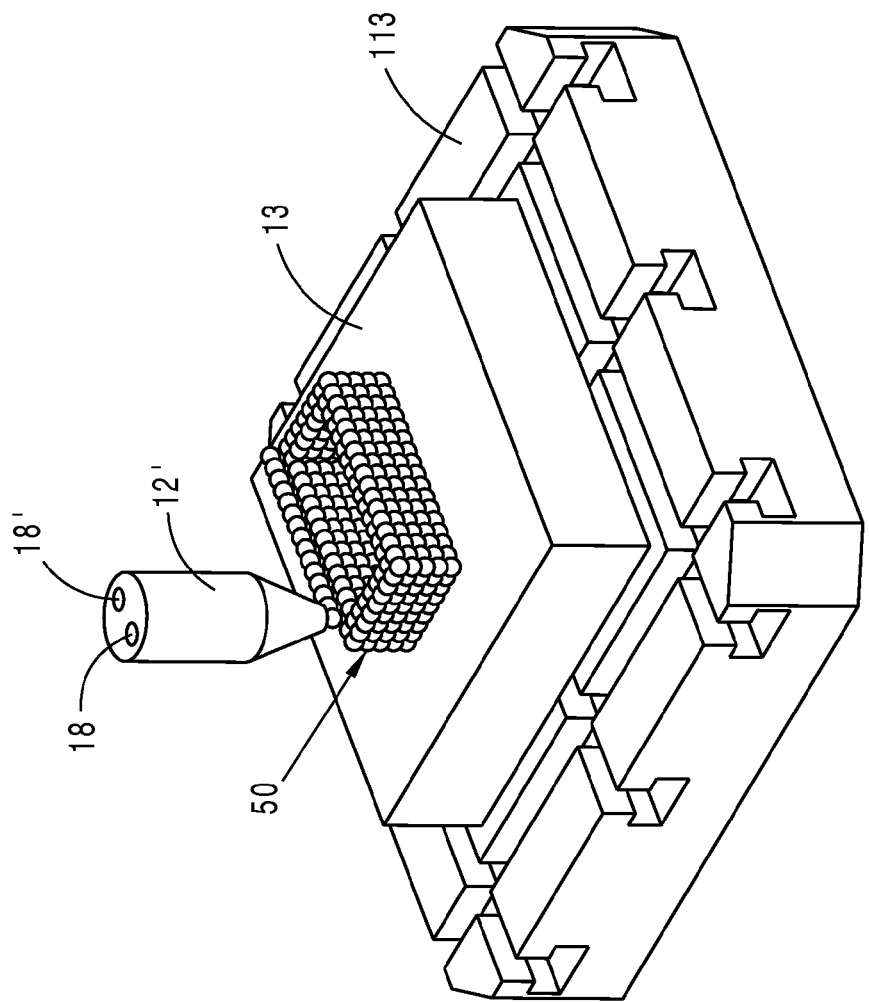
FIG. 4 shows a device for producing an object by means of multiple material components.

The discharge unit 12' according to FIG. 4 is similar to U.S. Pat. No. 8,292,610, the specification thereof being hereby incorporated by reference. By discharging drops from the discharge unit 12' the object 50 is created layer by layer on an object support 13, which is movable on a construction table 113 in the three spatial directions. A fibre element, which is embedded into the solidifiable material at the point of impact, can be additionally supplied, where required, by means of a fibre feed device controlled by a fibre control device. The discharge unit 12' connects to a material storage device 18, 18' for each material component and material processed by a processing unit is fed under a pressure of more than 10 Mpa to the material storage device by means of a pressure generating unit. By means of the preferably timed outlet the drops are generated and transported in a construction area for construction of the object 50, 50'. The discharge unit 12' is preferably a part of a plasticising unit, which is actually known in principle in injection moulding technology and which at the same time also comprises the pressurisable material storage device for incorporating the fluid phase. The pressure on the fluid phase in the material storage device generates the drops by direct coupling.

Figure 2:
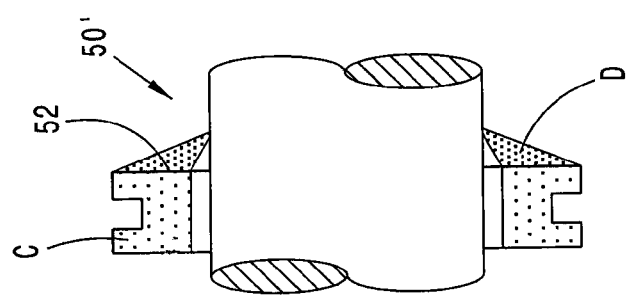
FIG. 2 shows a further object produced according to the method of the invention, on which a second material component is moulded e.g. as a seal.
Figure 1:
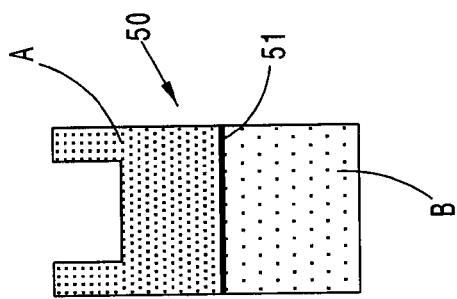
FIG. 1 shows an object produced from two material components with an edge region joining the two material components in a non-positive-locking manner.

Multiple material components A, B or C, D are discharged by means of multiple discharge units 12' and at least from multiple material storage devices 18, 18'. The material components respectively form parts of the object 50, 50' to be produced, as is clearly shown in FIGS. 1, 2. Since the construction occurs in direct construction sequence, in the case of multiple discharge units a different material for the construction of the object can be discharged in any desired sequence, i.e. layer for layer or line for line and down to droplet by droplet. This discharge can change in a programmable manner, i.e. depending on the program settings and thus on the geometry of the object, different materials can be placed alternately next to one another down to the smallest discharge quantity of a drop and thus drop by drop. Thus, in FIG. 1, for example, edge regions 51 that virtually fuse together and merge into one another without boundaries are formed between the different material components A, B. This leads to a connecting structure such as only results when using only one material or one material component in a single process. Thus, in relation to the drop size a kind of positive-locking connection such as e.g. an interlocking connection occurs. However, it is also possible to form boundary regions 52 between the different material components that abut one another without joining. FIG. 2 shows the moulding of a seal composed of a softer material component D, for example, onto a further harder material component C, for example. Thus, materials, which as a result of van der Waals forces or because of reactive properties cannot otherwise be processed with one another, i.e. are not compatible, can also be placed next to one another.

The whole can be achieved, for example, by two discharge units synchronised with one another discharging the material components in any desired sequence. There can be an optimisation of this process, for example, in the synchronous production of multiple parts at a geometric spacing, in which the travel movement paths of the discharge units are minimised. In principle, it is recommended that the outlets of the two discharge units or the material storage devices 18, 18' lie closely next to one another, so that little time passes possibly for a travel movement during the change of material components. Thus, fusing edge layers can be formed in the edge region in very quick alternation.

A material component forming an intermediate layer 53 and configured as a separable connection between the materials adjoining the intermediate layer 53 can also be discharged in the edge region 51 or boundary region 52. FIG. 3a shows a corresponding configuration for the case of the production of a ball and socket joint 60. The intermediate layer 53 is still recognisable in FIG. 3a, whereas in FIG. 3b it is replaced by a gap 54. As the structure forming the parts of ball 61 and socket 62 the material of the intermediate layer 53 can form a sliding connection and, as required, can also be used as a sliding means in the ball and socket joint. Thus, upon movement the intermediate layer 53 either disintegrates completely or remains as sliding means. It can be useful here to configure the boundary regions to abut one another without joining in order to obtain a geometrically closed surface of the parts that are later movable into one another. However, a connecting structure can also be configured to hold the sliding means in place. This shows what possibilities are made available to a person skilled in the art completely as required with this method. With this method a predetermined spacing or a clearance between the parts of the object adjoining the intermediate layer 53 is settable by means of the intermediate layer, i.e. the spacing can be changed in a programmable manner, where necessary, even from part to part, which is only possible with extremely high expenditure, for example, in the injection moulding process.

Therefore, in principle, an object, in which multiple adjoining parts composed of different material components are present, is produced with the method or can be produced therewith. After the production the parts are joined to one another by a structure composed of different material components connecting them, wherein a structure results practically as in a production from one material. However, the material component can also be used so that it is discharged as a support for the further material components that is detachable after production of the object. In this case the boundary regions 52 are configured so that as good a surface quality of the object as possible results "behind" the support, wherein this geometry is already formed during discharge of the material. Thus, overhangs can also be easily formed on the object to be produced.

It is clearly understood that the material components do not have to be compatible with one another and can still be placed next to one another, as is possible, for example, with corresponding van der Waals forces. Use is also possible, for example, with different material properties such as in use of a material component that is hard in the state of use, for example, and a soft material component. In particular, the production of permanent connections but also the production of toothing or other non-positive and positive-locking connections are conceivable.

It is clearly understood that this description can be subject to a wide variety of modifications, changes and adaptations, which move into the realm of equivalents to the attached claims.

The invention claimed is:

1. Method for producing a three-dimensional object in direct construction sequence by additive construction from solidifiable material, which is in the starting state a plasticized material or a plasticizable material,
   wherein in the direct construction sequence different material components are discharged under a pressure of more than 10 MPa alternately in a programmable manner by means of multiple discharge units and, already joined to one another as a result of the discharge, configure different parts of the object,
   wherein the different material components are placed next to one another drop by drop wherein the pressure generates the drops by direct coupling,
   wherein the geometric proportions obtained during discharge already correspond to a geometry of the object in a final state,
   wherein the material components between each other form edge regions merging and fusing into one another without boundaries,
   wherein the material components constitute a connecting structure at the edge regions.

2. Method according to claim 1, wherein the additive construction occurs from layer to layer.

3. Method according to claim 1, wherein the drops join together in a positive-locking manner.

4. Method according to claim 1, wherein there is discharged in the edge region a material component forming an intermediate layer and configured as a separable connection between the materials adjoining the intermediate layer.

5. Method according to claim 4, wherein a material component is discharged as a support for the at least one further material component, which can be detached after production of the object.

6. Method according to claim 1, wherein the material components are not compatible with one another.

7. Method according to claim 1, wherein the different material components form a structure connecting multiple adjoining parts.

8. Method according to claim 7, wherein the structure connecting the parts forms a sliding connection or an intermediate layer, which adjoins the parts and is detachable upon movement.

9. Method according to claim 8, wherein the intermediate layer forms a predetermined spacing or a clearance between the parts of the object adjoining the intermediate layer.

10. Method according to claim 1, wherein a standard commercially available material or a material present during injection moulding is used as solidifiable material.

11. Method according to claim 1, wherein the solidifiable material is processed by a plasticising unit wherein the plasticising unit includes the multiple discharge units.

12. Method for producing a three-dimensional object in direct construction sequence by additive construction from solidifiable material, which is in the starting state a plasticized material or a plasticizable material,
   wherein in the direct construction sequence different material components are discharged under a pressure of more than 10 MPa alternately in a programmable manner by means of multiple discharge units and, already joined to one another as a result of the discharge, configure different parts of the object,
   wherein the different material components are placed next to one another drop by drop wherein the pressure generates the drops by direct coupling, wherein the geometric proportions obtained during discharge already correspond to a geometry of object in a final state, wherein the material components between each other form boundary regions of the different material components abutting one another without joining and constituting a surface structure.

13. Method according to claim 12, wherein there is discharged in the boundary region a material component forming an intermediate layer and configured as a separable connection between the materials adjoining the intermediate layer.

14. Method according to claim 13, wherein a predetermined spacing or a clearance between the parts of the object adjoining the intermediate layer is set by means of the intermediate layer.

15. Method according to claim 14, wherein a material component is discharged as a support for the at least one further material component, which can be detached after production of the object.

16. Method according to claim 12, wherein the material components are not compatible with one another.

17. Method according to claim 12, wherein the different material components form a structure connecting multiple adjoining parts.

18. Method according to claim 17, wherein the structure connecting the parts forms a sliding connection or an intermediate layer, which adjoins the parts and is detachable upon movement.

19. Method according to claim 18, wherein the intermediate layer forms a predetermined spacing or a clearance between the parts of the object adjoining the intermediate layer.

20. Method according to claim 12, wherein a standard commercially available material or a material present during injection moulding is used as solidifiable material.

21. Method according to claim 12, wherein the solidifiable material is processed by a plasticising unit wherein the plasticising unit includes the multiple discharge units.

* * * * *